United States Patent
Caruso et al.

(10) Patent No.: US 9,981,433 B2
(45) Date of Patent: May 29, 2018

(54) METHODS FOR MODIFYING WIND TURBINE BLADE MOLDS

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 301 days.

(21) Appl. No.: 14/862,191

(22) Filed: Sep. 23, 2015

(65) Prior Publication Data

US 2017/0080653 A1    Mar. 23, 2017

(51) Int. Cl.
| | |
|---|---|
| *B32B 37/00* | (2006.01) |
| *B29C 73/10* | (2006.01) |
| *B29C 65/08* | (2006.01) |
| *B29C 73/12* | (2006.01) |
| *B29K 105/06* | (2006.01) |
| *B29L 31/08* | (2006.01) |

(52) U.S. Cl.
CPC ............ *B29C 73/10* (2013.01); *B29C 65/08* (2013.01); *B29C 73/12* (2013.01); *B29K 2105/06* (2013.01); *B29L 2031/085* (2013.01); *Y02P 70/523* (2015.11)

(58) Field of Classification Search
CPC ......... B29C 65/08; B29C 65/16; B29C 73/10; B29C 73/12; B65B 51/225; B65B 51/227
USPC ........................................ 156/73.1
See application file for complete search history.

(56) References Cited

U.S. PATENT DOCUMENTS

| | | | |
|---|---|---|---|
| 2003/0116262 A1* | 6/2003 | Stiesdal | B29C 70/443 156/245 |
| 2013/0312900 A1* | 11/2013 | Austinat | B29D 99/0028 156/245 |
| 2015/0251370 A1* | 9/2015 | Kirkeby | B29C 70/342 156/196 |
| 2015/0273771 A1* | 10/2015 | Schreiber | B29C 70/386 156/245 |

* cited by examiner

*Primary Examiner* — James Sells
(74) *Attorney, Agent, or Firm* — Dority & Manning, P.A.

(57) ABSTRACT

The present disclosure is directed methods for modifying molds of rotor blades of a wind turbine. In certain embodiments, the blade mold is constructed, at least in part, of a thermoplastic material optionally reinforced with a fiber material. In one embodiment, the method includes identifying at least one blade mold addition for the mold of the rotor blade and positioning the blade mold addition at a predetermined location of the mold of the rotor blade. Further, the blade mold addition is constructed, at least in part, of a thermoplastic material. Thus, the method includes applying at least one of heat, pressure, or one or more chemicals at an interface of the blade mold addition and the mold so as to join the blade mold addition to the mold. In further embodiments, the methods described herein are also directed repairing thermoplastic blade molds.

12 Claims, 7 Drawing Sheets

METHODS FOR MODIFYING WIND TURBINE BLADE MOLDS

FIELD OF THE INVENTION

The present disclosure relates generally to wind turbine rotor blades, and more particularly to methods for modifying (e.g. repairing or extending) blade molds for wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset or a thermoplastic resin. In addition, methods for manufacturing wind turbine rotor blades may include forming the rotor blades in blade segments. The blade segments may then be assembled to form the rotor blade.

Typical blade molds are constructed of a thermoset resin material. Thus, repair of the mold requires grinding out defective regions and re-laminating the defective area, mostly by hand. The repairs must be allowed to cure before the mold can be reused, which in some cases can take several hours due to repair and/or cure time. Accordingly, conventional repair methods can be expensive and/or time consuming. In addition, existing thermoset molds cannot easily be modified for manufacturing new parts. Thus, when new blade parts are developed, new molds must be manufactured as well.

Thus, an improved blade mold for manufacturing rotor blades and/or blade components that address the aforementioned issues would be advantageous. Accordingly, the present disclosure is directed to a thermoplastic rotor blade mold that can easily repaired and/or modified.

BRIEF DESCRIPTION OF THE INVENTION

Aspects and advantages of the invention will be set forth in part in the following description, or may be obvious from the description, or may be learned through practice of the invention.

In one aspect, the present disclosure is directed a method for modifying a mold of a rotor blade of a wind turbine. In certain embodiments, the mold is constructed, at least in part, of a thermoplastic material. The method includes identifying at least one blade mold addition for the mold of the rotor blade. Further, the blade mold addition is constructed, at least in part, of a thermoplastic material. The method also includes positioning the blade mold addition at a predetermined location of the mold of the rotor blade. Thus, the method also includes applying at least one of heat, pressure, or one or more chemicals at an interface of the blade mold addition and the mold so as to join the blade mold addition to the mold.

In certain embodiments, the blade mold additions may include any suitable component or volume that can be added to the pre-existing mold surface so as to modify the mold geometry. As such, the blade mold addition(s) can be any of the following add-on components: a recess, a bump or protrusion, a chord-wise strip, a blade mold tip extension, a blade mold chord extension (e.g. leading or trailing edge mold extensions), a blade root extension, or any other suitable blade mold add-ons for altering the mold.

In one embodiment, the method may further include providing one or more layers of thermoplastic material at the interface between the blade mold addition and the mold. Thus, the layers of thermoplastic material are configured to improve the bond between the blade mold addition and the blade mold. In another embodiment, the method may include reinforcing at least a portion of the one or more layers of thermoplastic material with at least one fiber material.

In further embodiments, the step of applying heat, pressure, or one or more chemicals at the interface of the blade mold addition and the mold may include providing one or more heating elements at the interface and heating the mold via the one or more heating elements. More specifically, in certain embodiments, the heating elements are provided in at least one of the following locations: within the mold, on a surface of the mold, within the blade mold addition, and/or on surface of the blade mold addition. Alternatively, the step of applying at least one of heat, pressure, or one or more chemicals at the interface of the blade mold addition and the mold may include applying external heat, e.g. via welding, at the interface of the blade mold addition and the mold.

In another embodiment, the step of positioning the blade mold addition at the predetermined location of the mold of the rotor blade may include positioning the blade mold addition along a span of the mold or a chord-wise location of the mold.

In further embodiments, the method may include continuously welding the blade mold addition to the mold along a perimeter thereof, e.g. to provide a continuous weld. In another embodiment, the method may include welding one or more of the blade mold additions on an interior mold surface of the mold of the rotor blade.

In additional embodiments, the method may include controlling a welding temperature of the welding step such that the welding temperature is lower than a forming temperature of the blade mold addition. Thus, in certain embodiments, the mold material forming temperature is higher than the welding or process temperature used to form the desired blade parts.

In still further embodiments, the method may include providing one or more support members for supporting the mold. In certain embodiments, the support members may be constructed, at least in part, of a thermoplastic material. Thus, in particular embodiments, the method may include determining one or more locations for the support members based on the blade mold addition (e.g. the type and/or location of the blade mold addition). Thus, the support members can be easily attached, removed, and reattached to the blade mold via welding depending on the modifications made to the mold.

In yet another embodiment, the step of welding the blade mold addition to the mold may include any suitable types of welding, including but not limited to laser welding, resistance welding, direct heat welding, ultrasonic welding, induction welding, chemical welding, or similar.

In further embodiments, the blade mold may be reinforced with one or more fiber materials. More specifically, in certain embodiments, the fiber materials as described herein may include at least one of glass fibers, carbon fibers, polymer fibers, ceramic fibers, nanofibers, metal fibers, or any other suitable fiber material.

In another aspect, the present disclosure is directed to a method for repairing a mold of a rotor blade of a wind turbine. The method includes identifying at least one defect on the mold. Further, the mold may be constructed, at least in part, of a thermoplastic material reinforced with at least one fiber material. Another step includes applying at least one of heat, pressure, or one or more chemicals to the at least one defect for a predetermined time period until the defect is repaired.

In one embodiment, the method may also include positioning one or more layers of thermoplastic material with the defect. Thus, in certain embodiments, the step of applying at least one of heat, pressure, or one or more chemicals to the at least one defect may include welding the one or more layers of thermoplastic material to the defect of the mold for a predetermined time period until the defect is repaired.

In another embodiment, the method may include designing the mold so as to withstand the welding process at the interface. More specifically, the method may include reinforcing the mold at the interface with at least one of a predetermined thickness or a structural member such that the welding step is localized to the interface. In other words, the interface (where the welding takes place) may be sufficiently thick and/or supported such that the welding process only modifies the interface and not the remainder of the blade mold. Thus, the surface temperature at the interface may be configured to melt during the welding step, whereas the remainder of the mold may remain unchanged. As such, the mold thickness at the interface can be designed to be thick enough and/or may be supported by a structural member (e.g. a plate or similar) such that the interface can be locally heated and deformed with the remainder of the mold being unaffected. In further embodiments, the step of welding the one or more layers of thermoplastic material to the defect may include at least one of laser welding, resistance welding, direct heat welding, ultrasonic welding, induction welding, chemical welding, or any other suitable type of welding.

In yet another aspect, the present disclosure is directed to a mold modifying kit for a blade mold of a wind turbine. Further, the mold may be constructed, at least in part, of a thermoplastic material. Thus, the mold modifying kit may further include at least one blade mold addition also constructed, at least in part, of thermoplastic material. In addition, the mold modifying kit may include one or more layers of thermoplastic material configured to assist bonding of the blade mold addition to the mold.

In one embodiment, the mold modifying kit may include a heating apparatus configured to weld at least a portion of the blade mold addition to the mold of the rotor blade. More specifically, in certain embodiments, the heating apparatus may include a welding apparatus, a radiation source, a heat lamp, a pump, a light source, a heated blanket, one or more chemical solvents, or similar.

In another embodiment, the blade mold additions may include at least one of a recess, a bump or protrusion, a chord-wise strip, a blade mold tip extension, a blade mold chord extension (e.g. leading or trailing edge mold extensions), a blade root extension, or any other suitable blade mold add-ons for altering the mold. As such, in certain embodiments, the heating apparatus may be configured to weld the one or more blade mold additions to the mold of the rotor blade.

In further embodiments, the mold modifying kit may further include one or more support members configured to support the mold. Further, the support members may be constructed, at least in part, of a thermoplastic material. Thus, the heating apparatus may be configured to weld the one or more support members to the mold of the rotor blade, e.g. in a plurality of locations that can be adjusted as needed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for modifying molds of rotor blades of a wind turbine. In certain embodiments, the blade mold is constructed, at least in part, of a thermoplastic material optionally reinforced with a fiber material. Thus, in one embodiment, the method includes identifying at least one blade mold addition for the blade mold and positioning the blade mold addition at a predetermined location of the mold. Further, the blade mold addition is constructed, at least in part, of a thermoplastic material. Thus, the method includes applying at least one of heat (e.g. welding), pressure, and/or or more chemicals at an interface of the blade mold addition and the blade mold so as to modify the pre-existing blade mold.

In another embodiment, the present disclosure is directed to a method for repairing a thermoplastic mold of a wind turbine rotor blade. Thus, the method includes identifying at least one defect on the mold of the rotor blade and applying heat, pressure, and/or one or more chemicals to the defect(s) so as to effectively anneal the defect until it is repaired.

The present disclosure provides many advantages not present in the prior art. For example, the thermoplastic rotor blade mold of the present disclosure can easily repaired and/or modified, e.g. via welding. Thus, the molds of the present disclosure can be repaired in less time and for less money than conventional molds. In addition, mold add-ons can be easily added to the mold to provide a more versatile blade mold without requiring new molds or expensive mold inserts.

Figure 1:
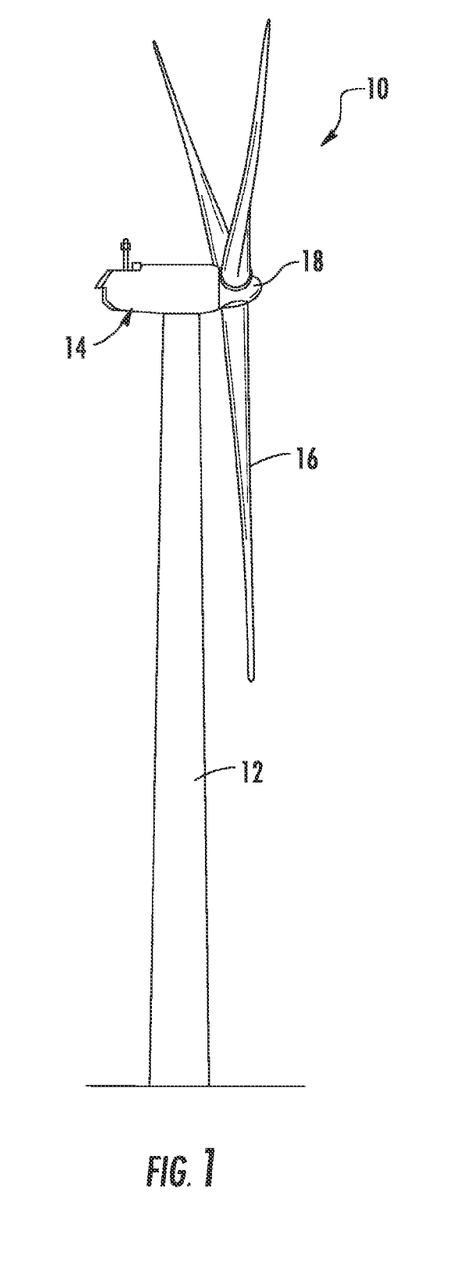
FIG. 1 illustrates a perspective view of one embodiment of a wind turbine according to the present disclosure.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
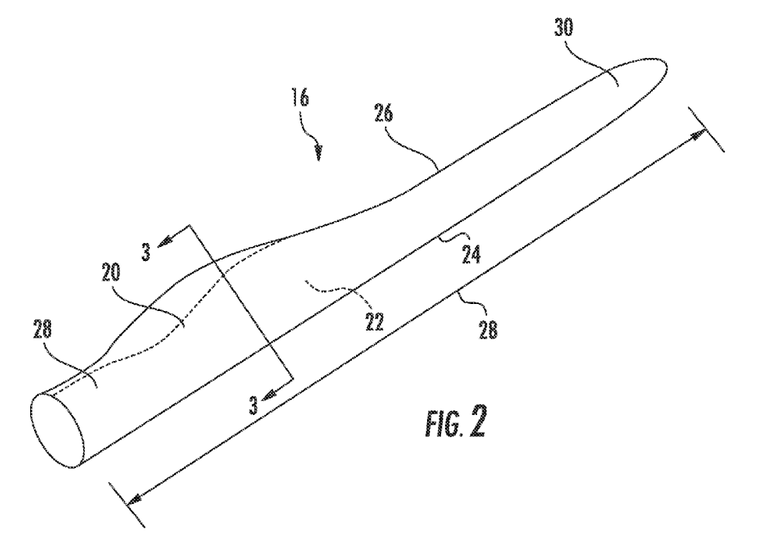
FIG. 2 illustrates a perspective view of one embodiment of a rotor blade of a wind turbine according to the present disclosure.

Referring now to FIG. 2, a more detailed view of one of the rotor blades 16 of FIG. 1 is illustrated. As shown, the rotor blade 16 includes a blade shell 19 having an upper shell member 20 and a lower shell member 22 that define an outer surface 21. Further, the upper shell member 20 is configured as the suction side surface of the blade 16, while the lower shell member 22 is configured as the pressure side surface of the blade 16. Thus, the upper and lower shell members 20, 22 generally serve as the outer casing/covering of the rotor blade 16 and may define a substantially aerodynamic profile, such as by defining a symmetrical or cambered airfoil-shaped cross-section.

The rotor blade 16 also includes a leading edge 24 and a trailing edge 26, as well as a blade root section 28 and the blade tip section 29. The blade root section 28 of the rotor blade 16 is configured to be mounted or otherwise secured to the rotor 18 (FIG. 1). In addition, as shown in FIG. 2, the rotor blade 16 defines a span 23 that is equal to the total length between the blade root section 28 and the blade tip section 29. The rotor blade 16 also defines a chord 27 that is equal to the total length between a leading edge 24 of the rotor blade 16 and a trailing edge 26 of the rotor blade 16. As is generally understood, the chord 27 may generally vary in length with respect to the span 23 as the rotor blade 16 extends from the blade root section 28 to the blade tip section 29.

As is well known in the art, the upper shell member 20 and the lower shell member 22 may be joined together at the leading edge 24 and trailing edge 26 or any other suitable location. Further, the rotor blade 16 may also include an internal cavity 25 (FIG. 3) in which various structural members, such as spar caps 32, 34 and one or more shear webs 30 according to the present disclosure, may be configured. Thus, the spar caps 32, 34 may generally be designed to control the bending stresses and/or other loads acting on the rotor blade 16 in a generally span-wise direction (a direction parallel to the span 23 of the rotor blade 16) during operation of a wind turbine 10. In addition, the spar caps 32, 34 may be designed to withstand the span-wise compression occurring during operation of the wind turbine 10. Further, the shear web(s) 30 may be configured to increase the rigidity in the rotor blade 16.

In additional embodiments, the rotor blade 16 of the present disclosure may be a modular rotor blade, for example, such as the rotor blades described in U.S. patent application Ser. No. 14/753,137 filed Jun. 29, 2105 and entitled "Modular Wind Turbine Rotor Blades and Methods of Assembling Same," which is incorporated herein by reference in its entirety, have a modular panel configuration.

Figure 3:
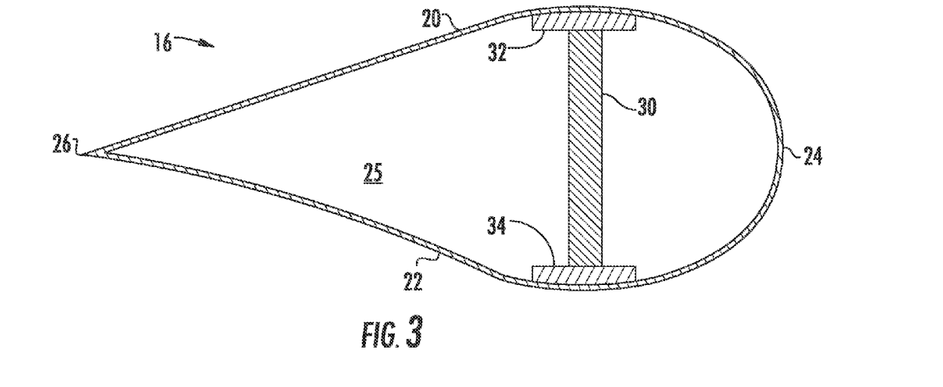
FIG. 3 illustrates a cross-sectional view of the rotor blade of FIG. 2 along line 3-3.

Referring particularly to FIG. 3, the upper shell member 20 may contain an upper spar cap 32 configured on an internal surface thereof. Similarly, the lower shell member 22 may contain a lower spar cap 34 configured on an internal surface thereof. The shear web(s) 30 extends between the spar caps 32, 34 along a longitudinal length of the blade 16 in a generally span-wise direction. The blade shell 19 may be constructed, at least in part, from a thermoset or a thermoplastic material. In addition, as mentioned, the thermoplastic and/or the thermoset material as described herein may optionally be reinforced with a fiber material, including but not limited to glass fibers, carbon fibers, polymer fibers, ceramic fibers, nanofibers, metal fibers, or similar or combinations thereof. In addition, the direction of the fibers may include biaxial, unidirectional, triaxial, or any other another suitable direction and/or combinations thereof. Further, the fiber content may vary depending on the stiffness required in the corresponding blade component, the region or location of the blade component in the rotor blade 16, and/or the desired weldability of the component.

The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Figure 4:
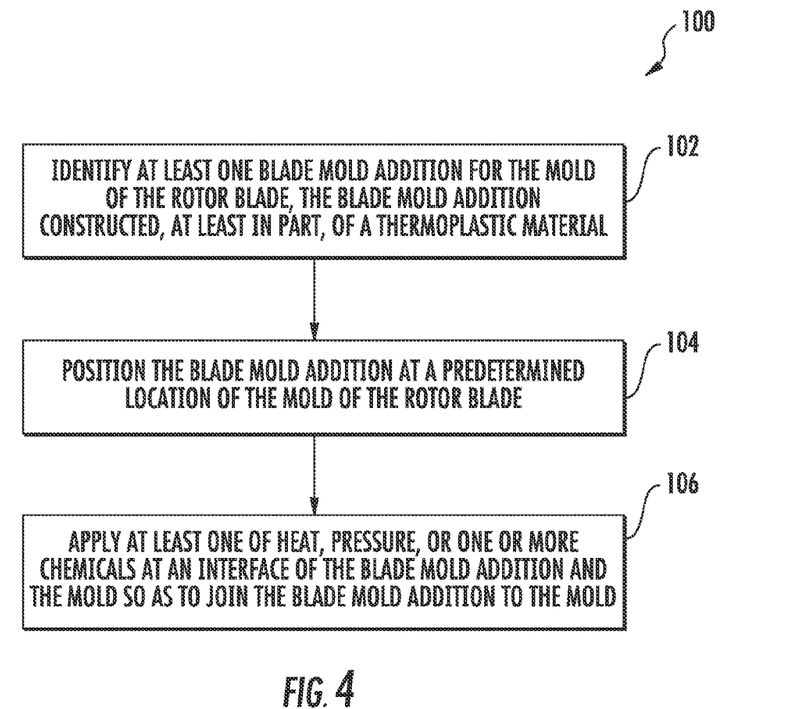
FIG. 4 illustrates a flow diagram of one embodiment of a method for modifying a mold of a rotor blade of a wind turbine according to the present disclosure.

Referring now to FIGS. 4-11, various embodiments of modifying a mold 36 used for manufacturing rotor blades 16 as described herein are illustrated. Thus, the methods described herein can be used to easily modify the aerodynamic shape of blade molds by heating and reforming the surface of the molds and/or welding new material to the mold surface. For example, as shown in FIG. 4, a flow diagram of one embodiment of a method 100 for modifying the mold of the rotor blade 16 of a wind turbine 10 according to the present disclosure is illustrated. More specifically, the molds described herein may be constructed, at least in part, of a thermoplastic material optionally reinforced with one or more fiber materials. For example, in particular embodiments, the fiber materials may include at least one of glass fibers, carbon fibers, polymer fibers, ceramic fibers, nanofibers, metal fibers, or any other suitable fiber material.

Figure 5:
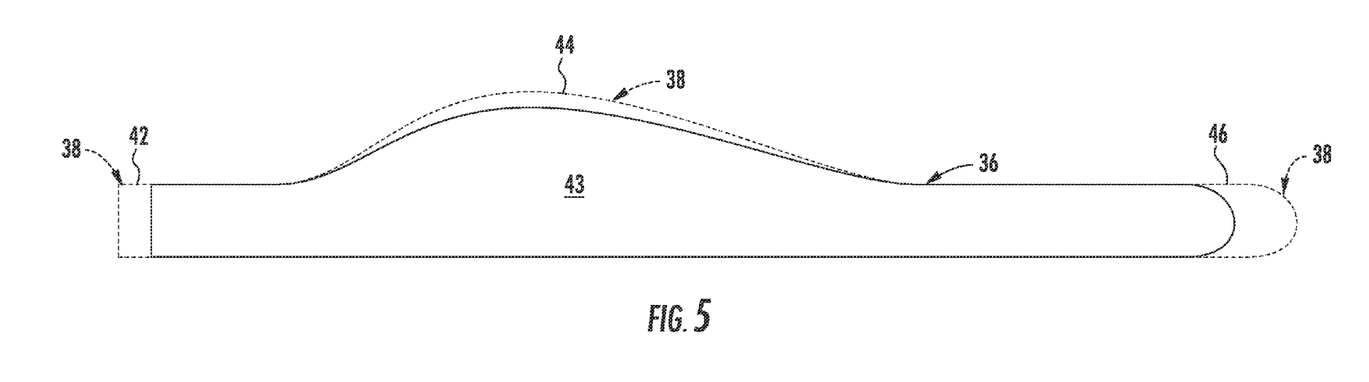
FIG. 5 illustrates a top view of one embodiment of a blade mold having a plurality of blade mold additions configured therewith according to the present disclosure.
Figure 6:
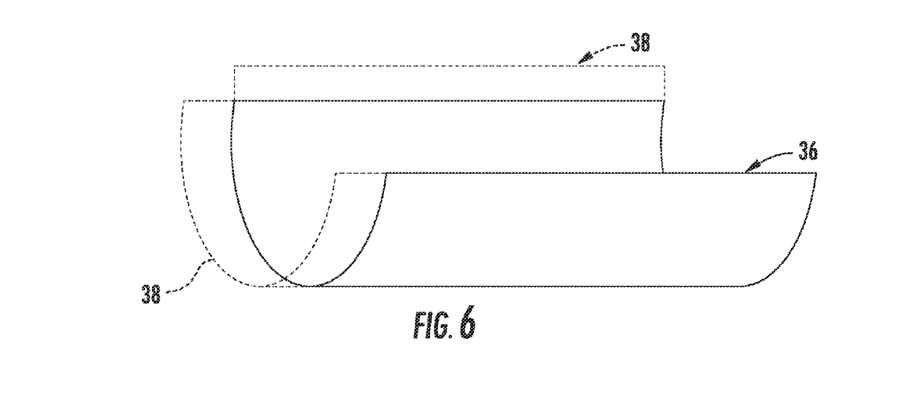
FIG. 6 illustrates a perspective view of another embodiment of a blade mold having a plurality of blade mold additions configured therewith according to the present disclosure.

As shown at 102, the method 100 includes identifying at least one blade mold addition 38 for the mold 36 of the rotor blade 16. It should be understood that the blade mold 36 may include any suitable mold for the rotor blade 16 and/or blade components. For example, the mold 36 may include a mold for the shell members 20, 22 (FIG. 5), as well as a mold for one or more blade segments (FIG. 6). Further, the blade mold additions 38 may include any suitable component or volume that can be added to the pre-existing mold surface so as to modify the mold geometry. As such, the blade mold addition(s) 38 may include any of the following add-on components: a recess, a bump or protrusion, a chord-wise strip, a blade mold tip extension, a blade mold chord extension (e.g. leading or trailing edge mold extensions), a blade root extension, or any other suitable blade mold add-ons for altering the mold. For example, as shown in FIG. 5, the blade mold additions 38 may include a blade root mold extension 42, a trailing edge mold extension 44, or a blade tip mold extension 46. In addition, as shown in FIG. 6, the blade mold extensions 38 may include chord-wise or span-wise extensions for a blade segment mold 36.

As shown at 104, the method 100 includes positioning the blade mold addition 38 at a predetermined location of the mold 36 of the rotor blade 16. For example, as shown in FIGS. 5 and 6, the various additions 38 may be located along a span-wise or chord-wise location of the rotor blade mold 36. Further, as mentioned, the blade mold additions 38 may be located on an interior mold surface 43 of the blade mold 36. Thus, as shown at 106, the method 100 may include applying at least one of heat, pressure, and/or one or more chemicals (e.g. chemical solvents) at an interface 45 of the blade mold addition 38 and the mold 36 of the rotor blade 16.

Figure 7:
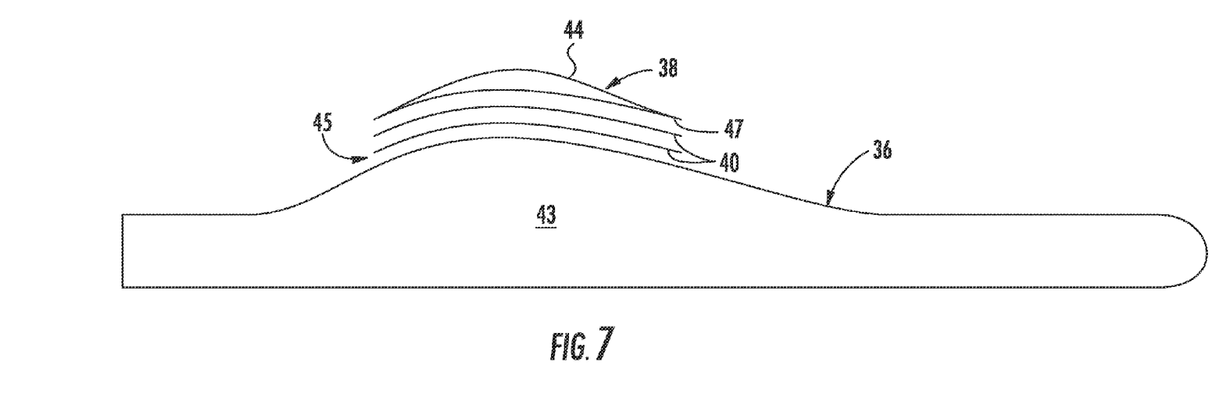
FIG. 7 illustrates a top view of another embodiment of a blade mold having a trailing edge mold addition configured therewith according to the present disclosure.

Referring now to FIG. 7, the method 100 may further include providing one or more layers 40 of thermoplastic material at an interface 45 between the blade mold addition 38 and the mold 36. Further, in certain embodiments, the method 100 may include reinforcing at least a portion of the one or more layers 40 of thermoplastic material with at least one fiber material such as those described herein. For example, as shown, the blade mold addition 38 includes a trailing edge addition 44 that can be welded to the blade mold 36 by placing a plurality of thermoplastic layers 40 between the trailing edge addition 44 and the mold 36 and then subsequently welded together. Further, the method 100 may include continuously welding the blade mold addition 38 to the mold 36 along a perimeter 47 thereof, e.g. so as to provide a continuous weld between the blade mold addition 38 and the blade mold 36.

In additional embodiments, the method 100 may include designing the blade mold 36 so as to withstand the welding process at the interface 45. More specifically, the method 100 may include reinforcing the mold 36 at the interface 45 with at least one of a predetermined thickness or a structural member such that the welding step is localized to the interface 45. In other words, the interface 45 (i.e. where the welding takes place) may be sufficiently thick and/or supported such that the welding process only modifies the area containing the interface 45 and not the remainder of the blade mold 36. Thus, the surface temperature at the interface 45 may be configured to melt during the welding step, whereas the remainder of the mold 36 may remain unchanged. As such, the mold thickness at the interface 45 can be designed to be thick enough and/or may be supported by a structural member (e.g. a plate or similar) such that the interface 45 can be locally heated and/or deformed with the remainder of the mold 36 being unaffected.

Figure 8:
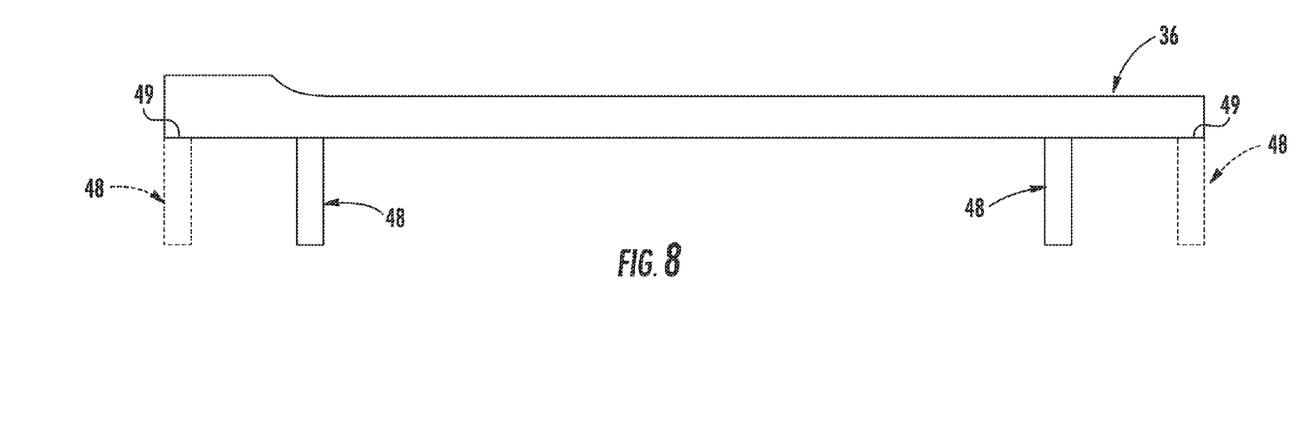
FIG. 8 illustrates a side view of one embodiment of a blade mold being supported by a plurality of support members according to the present disclosure.

Referring now to FIG. 8, the blade mold 36 may include one or more support members 48 configured to support the blade mold 36 and/or the blade mold additions 38. For example, as shown, the support members 48 are configured underneath the mold 36. In certain embodiments, the support members 48 may also be constructed, at least in part, of a thermoplastic material. Thus, in certain embodiments, the method 100 may include determining one or more locations 49 for the support members 48 based on the blade mold addition(s) 38. For example, as shown, the locations 49 for the support members 48 may be extended so as to support a mold 36 that is extended in overall length. Thus, the support members 48 can be easily attached, removed, and reattached to the blade mold 36 via welding.

It should be understood that any suitable welding technique may be utilized for any of the welding steps as described herein, including but not limited to laser welding, resistance welding, direct heat welding, ultrasonic welding, induction welding, chemical welding, or any other suitable type of welding.

Figure 9:
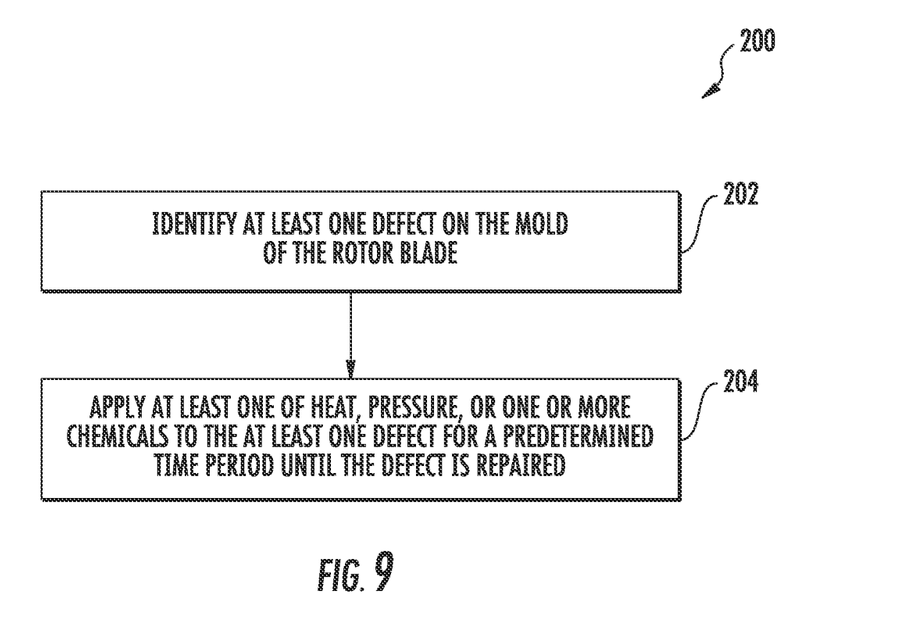
FIG. 9 illustrates a flow diagram of one embodiment of a method for repairing a defect of a blade mold of a wind turbine according to the present disclosure.
Figure 10:
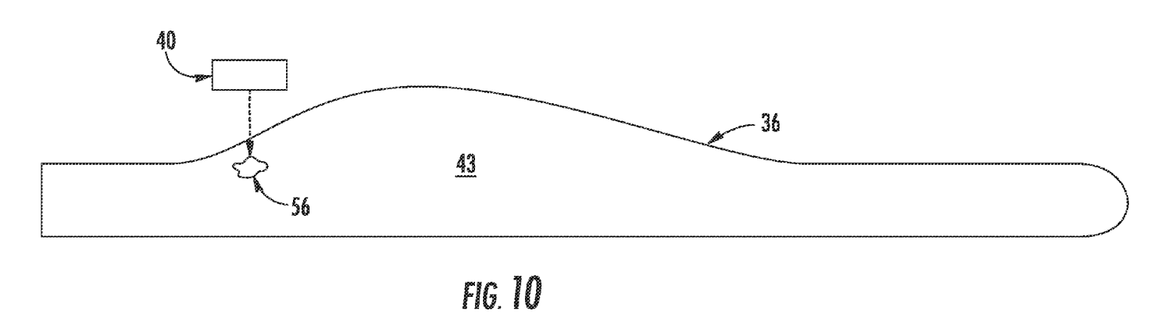
FIG. 10 illustrates a top view of another embodiment of a blade mold having a defect being repaired according to the present disclosure.

Referring now to FIG. 9, a flow diagram of one embodiment of a method 200 for repairing the mold 36 of the rotor blade 16 of a wind turbine 10 according to the present disclosure is illustrated. As shown at 202, the method 200 may include identifying at least one defect 56 on the mold 36 of the rotor blade 16. It should be understood that the defect(s) 56 may be located at any location on the mold 36 of the rotor blade 16. For example, as shown in FIG. 10, the defect 56 may be identified on the interior mold surface 43 of the mold 36. Further, in certain embodiments, the defect(s) 56 as described herein may include a crack, creep, void, hole, distortion, deformation, scratch, or any other blade defect. In addition, mentioned, the mold 36 may be constructed, at least in part, of a thermoplastic material reinforced with at least one fiber material. Thus, as shown at 204, the method 200 also includes applying at least one of heat, pressure, or one or more chemicals to the at least one defect for a predetermined time period until the defect is repaired. Accordingly, the thermoplastic resin of the rotor blade mold 36 may be effectively annealed at the location of the defect 56, thereby allowing the thermoplastic resin to fill in the defect(s) 56.

More specifically, as shown in FIG. 10, one or more layers 40 of thermoplastic material may be positioned or aligned with the defect 56. Thus, the method 200 may include welding the one or more layers 40 of thermoplastic material to the defect 56 of the mold 36 for a predetermined time period until the defect 56 is repaired.

Figure 11:
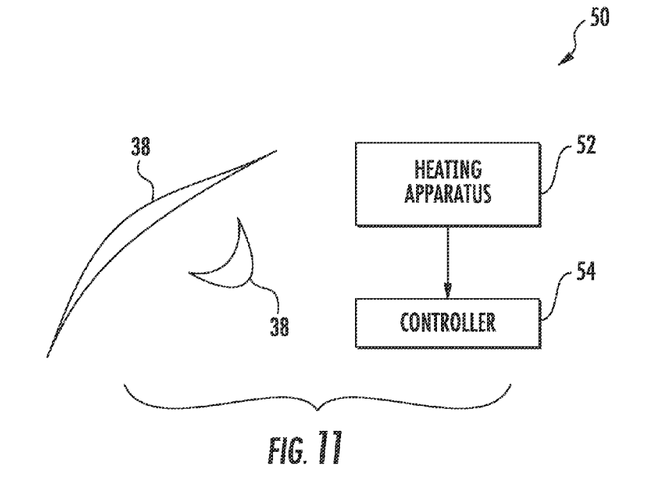
FIG. 11 illustrates a schematic diagram of one embodiment of a mold modifying kit according to the present disclosure.

Referring now to FIG. 11, a schematic diagram of a mold modifying kit 50 for a thermoplastic blade mold 36 of a rotor blade 16 of a wind turbine 10 is illustrated. As shown, the mold modifying kit 50 may include at least one blade mold addition 38 also constructed, at least in part, of thermoplastic material. For example, as mentioned, the blade mold addition(s) 38 may include recesses, bumps or protrusions, chord-wise strips, blade mold tip extensions, blade mold chord extensions, blade root extensions, or similar. Further, as mentioned, at least a portion of the rotor blade molds 36 as described herein may be constructed, at least in part, of a thermoplastic material reinforced with at least one fiber material. Further, the mold modifying kit 50 may include one or more layers of thermoplastic material configured to assist bonding of the blade mold addition 38 to the mold 36, e.g. as shown in FIG. 7. Thus, the mold modifying kit 50 may also include a heating apparatus 52 configured to weld at least a portion of the blade mold addition 38 to the mold 36 of the rotor blade 16. More specifically, in certain embodiments, the heating apparatus 52 may include a welding apparatus, a radiation source, a heat lamp, a pump, a light source, a heated blanket, one or more chemical solvents, or similar. It should be understood that the mold modifying kit 50 may be further configured according with any of the additional features as described herein.

For example, the mold modifying kit 50 may further include one or more support members 48 configured to support the mold 36 of the rotor blade 16. Further, the support members 48 may be constructed, at least in part, of a thermoplastic material. Thus, the heating apparatus 50 may be configured to weld the one or more support members 48 to the mold 36 of the rotor blade 16, e.g. in a plurality of locations that can be adjusted as needed. More specifically, in certain embodiments, the mold support members 50 may include discreet attachment points at multiple location on the mold 36, thereby enabling easy detachment and reattachment of the support members 48 in the area of the mold 26 to be modified. In addition, as shown in FIG. 11, the mold modifying kit 50 may further include a controller 54 configured to control a welding temperature of the welding process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for modifying a mold of a rotor blade of a wind turbine, the mold constructed, at least in part, of a thermoplastic material, the method comprising:
   identifying at least one blade mold addition for the mold of the rotor blade, the blade mold addition constructed, at least in part, of a thermoplastic material;
   positioning the blade mold addition at a predetermined location of the mold of the rotor blade; and,
   applying at least one of heat, pressure, or one or more chemicals at an interface of the blade mold addition and the mold so as to join the blade mold addition to the mold.

2. The method of claim 1, further comprising providing one or more layers of thermoplastic material at the interface between the blade mold addition and the mold.

3. The method of claim 2, further comprising reinforcing at least a portion of the one or more layers of thermoplastic material with at least one fiber material.

4. The method of claim 1, wherein applying at least one of heat, pressure, or one or more chemicals at the interface of the blade mold addition and the mold further comprises providing one or more heating elements at the interface and heating the mold via the one or more heating elements.

5. The method of claim 4, wherein the heating elements are provided in at least one of the following locations: within the mold, on a surface of the mold, within the blade mold addition, or on surface of the blade mold addition.

6. The method of claim 1, wherein applying at least one of heat, pressure, or one or more chemicals at the interface of the blade mold addition and the mold further comprises welding the interface of the blade mold addition and the mold.

7. The method of claim 1, further comprising continuously welding the blade mold addition to the mold along a perimeter thereof.

8. The method of claim 1, further comprising reinforcing the mold at the interface with at least one of a predetermined thickness or a structural member such that the welding step is localized to the interface.

9. The method of claim 1, further comprising providing one or more support members configured to support the mold, the support members being constructed, at least in part, of a thermoplastic material.

10. The method of claim 9, further comprising determining one or more locations for the support members based on a location of the blade mold addition.

11. The method of claim 6, wherein welding the interface of the blade mold addition and the mold further comprises at least one of laser welding, resistance welding, direct heat welding, ultrasonic welding, induction welding, or chemical welding.

12. The method of claim 1, wherein the mold is reinforced with one or more fiber materials.

\* \* \* \* \*